United States Patent
Collins (10) Patent No.: US 11,712,980 B2
(45) Date of Patent: Aug. 1, 2023

(54) VEHICLE POWER GENERATION HUMAN MACHINE INTERFACES

(71) Applicant: FORD GLOBAL TECHNOLOGIES, LLC, Dearborn, MI (US)

(72) Inventor: Patrick Gordon Collins, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1650 days.

(21) Appl. No.: 15/264,861

(22) Filed: Sep. 14, 2016

(65) Prior Publication Data

US 2018/0072252 A1    Mar. 15, 2018

(51) Int. Cl.
| | | |
|---|---|---|
| *B60R 16/023* | (2006.01) | |
| *B60L 58/12* | (2019.01) | |
| *B60R 16/03* | (2006.01) | |
| *G06F 3/041* | (2006.01) | |

(52) U.S. Cl.
CPC .......... *B60L 58/12* (2019.02); *B60R 16/0238* (2013.01); *B60R 16/03* (2013.01); *G06F 3/0412* (2013.01)

(58) Field of Classification Search
USPC ......................................................... 307/10.1
See application file for complete search history.

(56) References Cited

U.S. PATENT DOCUMENTS

| | | | | |
|---|---|---|---|---|
| 5,757,595 | A * | 5/1998 | Ozawa ................. | B60L 58/27 340/636.1 |
| 7,999,665 | B2 | 8/2011 | Chander et al. | |
| 8,125,324 | B2 | 2/2012 | Frey et al. | |
| 9,340,197 | B1 | 5/2016 | Miersch-Wiemes et al. | |
| 2001/0037301 | A1 * | 11/2001 | Shepley ................. | H04L 63/08 705/43 |
| 2003/0128507 | A1 * | 7/2003 | Metcalf ................. | G06F 1/266 361/679.21 |
| 2004/0001292 | A1 * | 1/2004 | Vanderkolk .............. | H02H 3/33 361/42 |
| 2006/0097673 | A1 * | 5/2006 | Jun ......................... | H02M 7/48 318/139 |
| 2006/0191180 | A1 | 8/2006 | Williams et al. | |

(Continued)

FOREIGN PATENT DOCUMENTS

| | | |
|---|---|---|
| CN | 104787026 A | 7/2015 |
| CN | 104816642 A | 8/2015 |

(Continued)

OTHER PUBLICATIONS

Notification of First Office Action; CN Application No. 2017108111491 dated Nov. 2, 2021.

(Continued)

*Primary Examiner* — Rexford N Barnie
*Assistant Examiner* — Xuan Ly
(74) *Attorney, Agent, or Firm* — David B. Kelley; Carlson, Gaskey & Olds, P.C.

(57) ABSTRACT

A vehicle includes a passenger cabin and a human machine interface (HMI) located remote from the passenger cabin. The HMI includes an electronic display and at least one power outlet adapted to selectively supply power to non-vehicle equipment. The HMI may be accessed to control the vehicle in a Power Generation mode.

12 Claims, 5 Drawing Sheets

(56) References Cited

U.S. PATENT DOCUMENTS

| | | | |
|---|---|---|---|
| 2010/0060015 A1* | 3/2010 | Buker | F02B 63/04 290/1 R |
| 2010/0230193 A1 | 9/2010 | Grider et al. | |
| 2010/0238006 A1 | 9/2010 | Grider et al. | |
| 2012/0132746 A1* | 5/2012 | Sizelove | B64D 11/0015 244/118.6 |
| 2013/0335002 A1* | 12/2013 | Moore | H02J 7/35 320/101 |
| 2014/0240086 A1* | 8/2014 | Van Wiemeersch | G05B 1/00 340/5.51 |
| 2014/0266001 A1* | 9/2014 | Wilde | H02J 7/35 320/101 |
| 2014/0303820 A1* | 10/2014 | Aoki | B60W 20/13 701/22 |
| 2015/0022994 A1 | 1/2015 | Bingle | |
| 2015/0203093 A1* | 7/2015 | Wright | B60W 20/10 701/22 |
| 2015/0217656 A1* | 8/2015 | Loftus | B60L 55/00 320/136 |
| 2015/0251539 A1* | 9/2015 | Sura | B60L 1/20 136/251 |
| 2015/0291017 A1* | 10/2015 | LaBiche | B60J 7/141 296/100.09 |
| 2016/0009232 A1* | 1/2016 | Budny | B25H 3/02 206/373 |
| 2016/0019775 A1 | 1/2016 | Fokkelman | |
| 2016/0146335 A1* | 5/2016 | McGuire | F16H 59/105 701/51 |
| 2016/0225203 A1* | 8/2016 | Asmar | G07C 9/00309 |
| 2016/0291152 A1* | 10/2016 | Chen | G01S 15/52 |
| 2017/0028837 A1* | 2/2017 | Welschoff | B60L 58/12 |
| 2017/0253199 A1* | 9/2017 | Tsunoda | B60R 16/0215 |
| 2017/0274774 A1* | 9/2017 | Iwaya | B60W 10/06 |
| 2017/0324189 A1* | 11/2017 | Baughman | H01R 13/5202 |
| 2018/0022337 A1* | 1/2018 | Burjes | B60W 10/30 477/4 |

FOREIGN PATENT DOCUMENTS

| | | | |
|---|---|---|---|
| JP | 1738947 | * | 1/2007 |
| JP | 1738947 | * | 3/2007 |
| KR | 20100036631 | * | 4/2010 |

OTHER PUBLICATIONS

Notification of Second Office Action, CN Application No. 2017108111491 dated Apr. 18, 2022.

* cited by examiner

VEHICLE POWER GENERATION HUMAN MACHINE INTERFACES

TECHNICAL FIELD

This disclosure relates to human machine interfaces for vehicles. An exemplary power generation human machine interface is mounted remotely from a vehicle passenger cabin and is accessible to control the vehicle in a Power Generation mode.

BACKGROUND

Modern vehicles offer a variety of energy usage options. One such energy usage option is known as Power Generation mode. In Power Generation mode, a vehicle power source generates power for uses other than propelling the vehicle. For example, electrical power may be generated and supplied to a power point for powering various hand-held tools at a construction work site. Controlling the Power Generation mode typically involves using an interface located inside a passenger cabin of the vehicle. This location may be inconvenient to the user.

SUMMARY

A vehicle according to an exemplary aspect of the present disclosure includes, among other things, a passenger cabin and a human machine interface (HMI) remote from the passenger cabin and including an electronic display and at least one power outlet adapted to selectively supply power to non-vehicle equipment.

In a further non-limiting embodiment of the foregoing vehicle, the HMI is configured to control the vehicle in a Power Generation mode.

In a further non-limiting embodiment of either of the foregoing vehicles, a power source provides power to the at least one power outlet of the HMI.

In a further non-limiting embodiment of any of the foregoing vehicles, the power source is at least one of an engine and an electric machine.

In a further non-limiting embodiment of any of the foregoing vehicles, the HMI is mounted within a truck bed of the vehicle.

In a further non-limiting embodiment of any of the foregoing vehicles, the HMI is mounted within a trunk of the vehicle.

In a further non-limiting embodiment of any of the foregoing vehicles, the electronic display includes a state of charge (SOC) gauge that displays a current SOC of a battery pack of the vehicle.

In a further non-limiting embodiment of any of the foregoing vehicles, the electronic display includes a power generation gauge that displays a current amount of power being generated by the vehicle during a Power Generation mode.

In a further non-limiting embodiment of any of the foregoing vehicles, the electronic display includes a fuel gauge that displays a current fuel level of the vehicle.

In a further non-limiting embodiment of any of the foregoing vehicles, the at least one power outlet includes a port for connecting the non-vehicle equipment to the vehicle.

In a further non-limiting embodiment of any of the foregoing vehicles, the HMI includes a plurality of power outlets, and at least a portion of the plurality of power outlets have different configurations.

In a further non-limiting embodiment of any of the foregoing vehicles, the HMI includes a power button actuable to initialize a Power Generation mode of the vehicle.

In a further non-limiting embodiment of any of the foregoing vehicles, the HMI includes a lock button actuable to lock or unlock the HMI.

In a further non-limiting embodiment of any of the foregoing vehicles, the HMI includes an authentication system adapted to detect a valid key or fob in the vicinity of the HMI.

A method according to another exemplary aspect of the present disclosure includes, among other things, accessing a human machine interface (HMI) to control a vehicle in a Power Generation mode, the HMI located remotely from a passenger cabin of the vehicle.

In a further non-limiting embodiment of the foregoing method, the method includes powering non-vehicle equipment during the Power Generation Mode.

In a further non-limiting embodiment of either of the foregoing methods, the HMI is located within a cargo area of the vehicle.

In a further non-limiting embodiment of any of the foregoing methods, the method includes actuating a power button of the HMI to initialize the Power Generation mode.

In a further non-limiting embodiment of any of the foregoing methods, the method includes authenticating whether a valid key or fob is in a vicinity of the HMI prior to initializing the Power Generation mode.

In a further non-limiting embodiment of any of the foregoing methods, the method includes actuating a lock button to lock or unlock the HMI.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details human machine interfaces for vehicles. An exemplary vehicle includes a passenger cabin and a human machine interface located remotely from the passenger cabin. The human machine interface includes at least an electronic display and one or more power outlets for supplying power to non-vehicle equipment. The vehicle can be controlled in a Power Generation mode to supply power to the non-vehicle equipment using the human machine interface. These and other features are discussed in greater detail in the following paragraphs of this detailed description.

Figure 1:
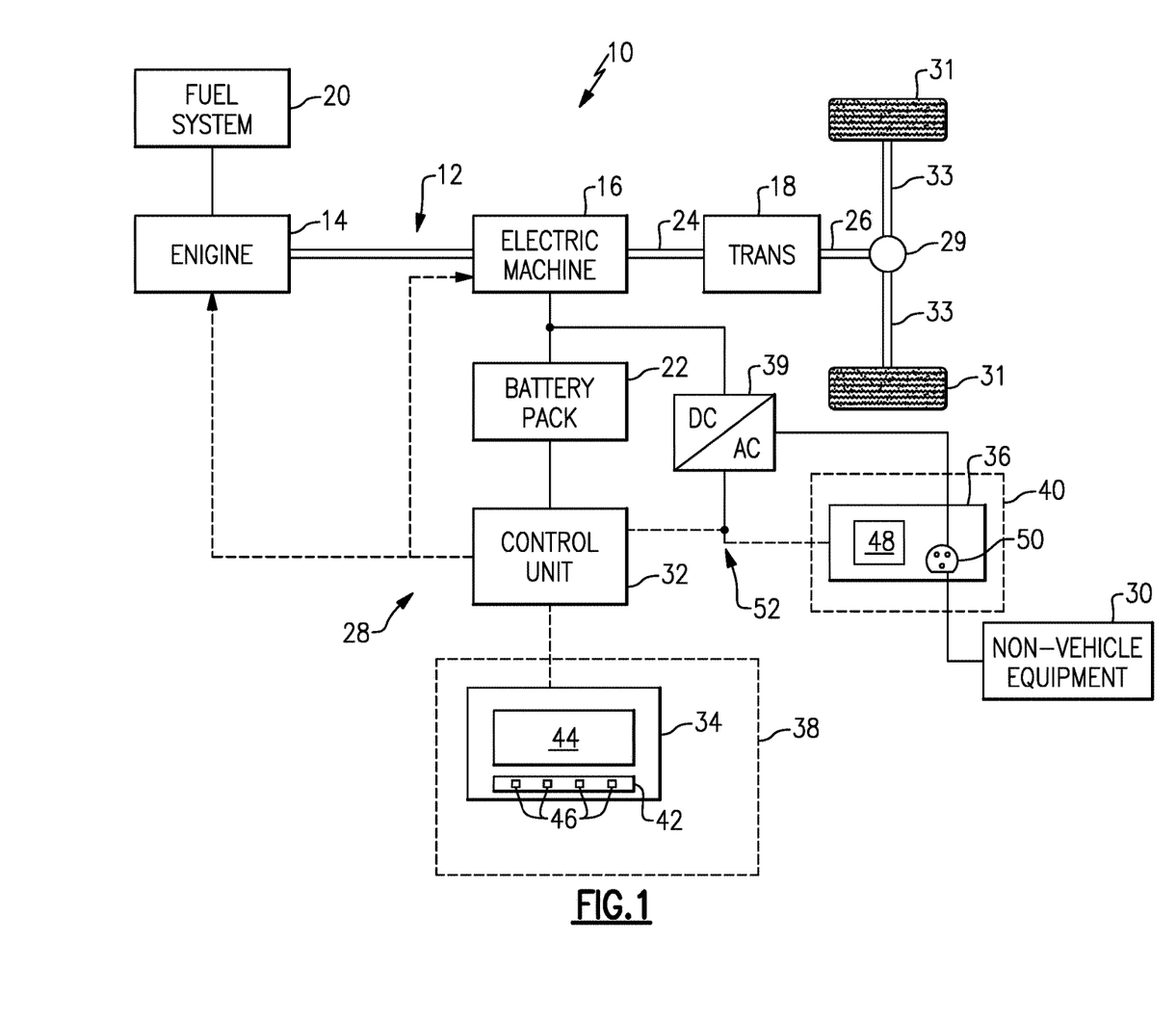
FIG. 1 schematically illustrates a powertrain of a vehicle.

FIG. 1 schematically illustrates a vehicle 10. This disclosure is applicable to any type of vehicle. The exemplary vehicle 10 includes a powertrain 12. In a non-limiting embodiment, the powertrain 12 is an electrified powertrain of a hybrid electric vehicle (HEV), a plug-in hybrid electric vehicle (PHEV), or a battery electric vehicle (BEV). However, this disclosure is also applicable to vehicles having convention powertrains (see, e.g., vehicle 100 of FIG. 2).

The powertrain 12 includes an engine 14, an electric machine 16, a transmission 18, a fuel system 20, and a high voltage battery pack 22. The engine 14 and the electric machine 16 are both available drive sources for powering the vehicle 10. The engine 14 generally represents a power source that may include an internal combustion engine such as a gasoline, diesel, or natural gas powered engine, or a fuel cell. The engine 14 generates power and corresponding torque that is supplied to the electric machine 16, such as when an engine disconnect clutch (not shown) is engaged. The fuel system 20 supplies energy in the form of fuel (i.e., gasoline, diesel, etc.) for powering the engine 14.

The electric machine 16 could be any type of electric machine. Example electric machines include an electric motor, a generator, or a combined motor/generator. In a non-limiting embodiment, the electric machine 16 is a permanent magnet synchronous motor. The battery pack 22 supplies energy for powering the electric machine 16. The battery pack 22 may be a high voltage traction battery pack that includes a plurality of battery assemblies (i.e., battery arrays or groupings of battery cells) that store electrical power that can be outputted to operate the electric machine 16.

The transmission 18 may include gear sets that are selectively operated using different gear ratios by selective engagement of friction elements such as clutches, planetary gears, and brakes (not shown) to establish desired multiple discrete or step drive ratios. The friction elements are controllable through a shift schedule that connects and disconnects certain elements of the gear set to control the ratio between a transmission input shaft 24 and a transmission output shaft 26. The transmission 18 may be automatically shifted from one ratio to another based on various vehicle and ambient operating conditions by an associated controller. The transmission 18 provides powertrain output torque to the transmission output shaft 26.

The transmission output shaft 26 is connected to a differential 29. The differential 29 drives a pair of wheels 31 via respective axles 33 that are connected to the differential 29. In a non-limiting embodiment, the differential 29 transmits approximately equal torque to each wheel 31 while permitting slight speed differences, such as when the vehicle 10 turns a corner. Different types of differentials or similar devices could be used to distribute torque from the powertrain 12 to one or more of the wheels 31. In some applications, torque distribution may vary depending on the particular operating motor condition, as a non-limiting example.

To drive the vehicle 10 using the engine 14, a disconnect clutch is at least partially engaged to transfer a portion of the engine torque to the electric machine 16, and then from the electric machine 16 to the transmission 18. The electric machine 16 may assist the engine 14 by providing additional power. This operation may be referred to as hybrid (HEV) mode or electric assist mode.

To drive the vehicle 10 using the electric machine 16 as the sole power source, the power flow remains the same except a disconnect clutch may isolate the engine 14 from the remainder of the powertrain 12. Combustion in the engine 14 may be disabled or otherwise turned off during this time to conserve fuel. Power electronics may convert DC voltage from the high voltage battery pack 22 into AC voltage for consumption by the electric machine 16. This operation mode may be referred to as an electric only or EV mode.

The vehicle 10 includes a vehicle energy management system 28 that can be used to control the vehicle 10, such as in the HEV and EV modes described above. In addition to the HEV and EV modes, the vehicle energy management system 28 permits operation of the vehicle 10 in a Power Generation (GEN) mode. In GEN mode, the engine 14 and/or the electric machine 16 generate power for use by the driver/operator for purposes of other than propelling the vehicle 10. For example, electrical power may be supplied for powering various non-vehicle equipment 30 (shown schematically) by operating the vehicle 10 in the GEN mode. In a non-limiting embodiment, the non-vehicle equipment 30 includes various tools that a contractor utilizes at a work site, such as saws, drills, or any other powered equipment. Other equipment, such as any hand-held tools and personal devices, is also contemplated within the scope of this disclosure.

Figure 4:
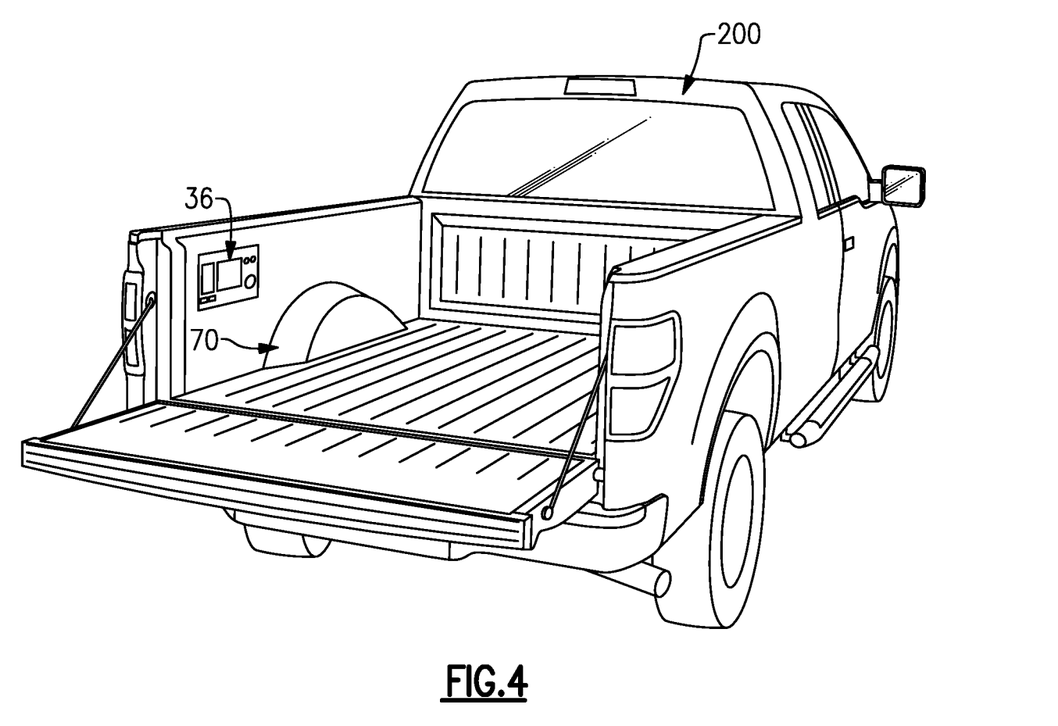
FIG. 4 illustrates a first exemplary mounting location of the human machine interface of FIG. 3.
Figure 5:
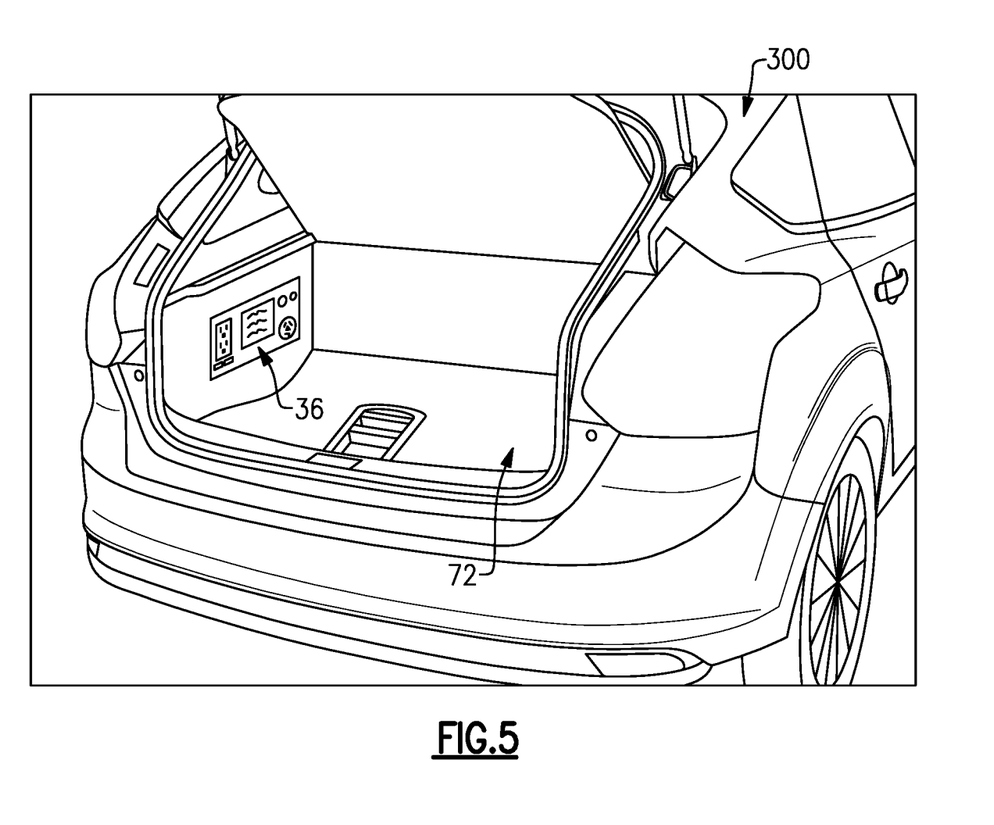
FIG. 5 illustrates a second exemplary mounting location of the human machine interface of FIG. 3.

The vehicle energy management system 28 may include a control unit 32, a first human machine interface (HMI) 34, a second human machine interface (HMI) 36 located remotely from the first HMI 34, and an inverter/converter 39. In a non-limiting embodiment, the first HMI 34 is positioned within a passenger cabin 38 of the vehicle 10 and the second HMI 36 is located at a location 40 that is remote from the passenger cabin 38. Example locations for the second HMI 36 are discussed in greater detail below with reference to FIGS. 4 and 5.

The first HMI 34 may include a user input 42 and a display 44, both shown schematically. The user input 42 may include a touchscreen and/or series of tactile buttons 46 for entering information. The display 44 may include a touchscreen and/or series of gauges for displaying information to the driver. In another non-limiting embodiment, the first HMI 34 is part of an in-dash infotainment system of the vehicle 10.

The second HMI 36 may be accessed to control the vehicle 10 in GEN mode. The second HMI 36 may include an electronic display 48 and one or more power outlets 50. Non-vehicle equipment 30 may be plugged into the power outlets 50 for powering such equipment using energy generated by the vehicle 10 during GEN mode. The inverter/converter 39 of the vehicle energy management system 28 may optionally be provided to convert DC power from the electric machine 16 to AC power that is supplied to the power outlets 50 during GEN mode.

The control unit 32 may be programmed with instructions for controlling the energy usage of the vehicle 10. In particular, the control unit 32 may control operation of the vehicle 10 during the various energy usage modes, including HEV mode, EV mode, and GEN mode. The control unit 32 may communicate with a vehicle system controller (VSE) of the vehicle 10 or any other controller for managing the energy usage operations. The control unit 32 may include one or more control modules equipped with executable instructions for interfacing with and commanding operation of various components of the vehicle energy management system 28. Each such control module may include a processing unit and non-transitory memory for executing the various control strategies and modes of the vehicle energy management system 28.

In a further non-limiting embodiment, the control unit 32 communicates control signals to each of the engine 14, the electric machine 16, the battery pack 22, and the inverter/converter 39 for controlling operation of the vehicle 10 during GEN mode. In another non-limiting embodiment, the first HMI 34 and the second HMI 36 communicate with the control unit 32 and with one another over a controller area network (CAN) 52. Either of the first HMI 34 and the second HMI 36 may be used to schedule, command and control operation of the vehicle 10 in GEN mode.

Figure 2:
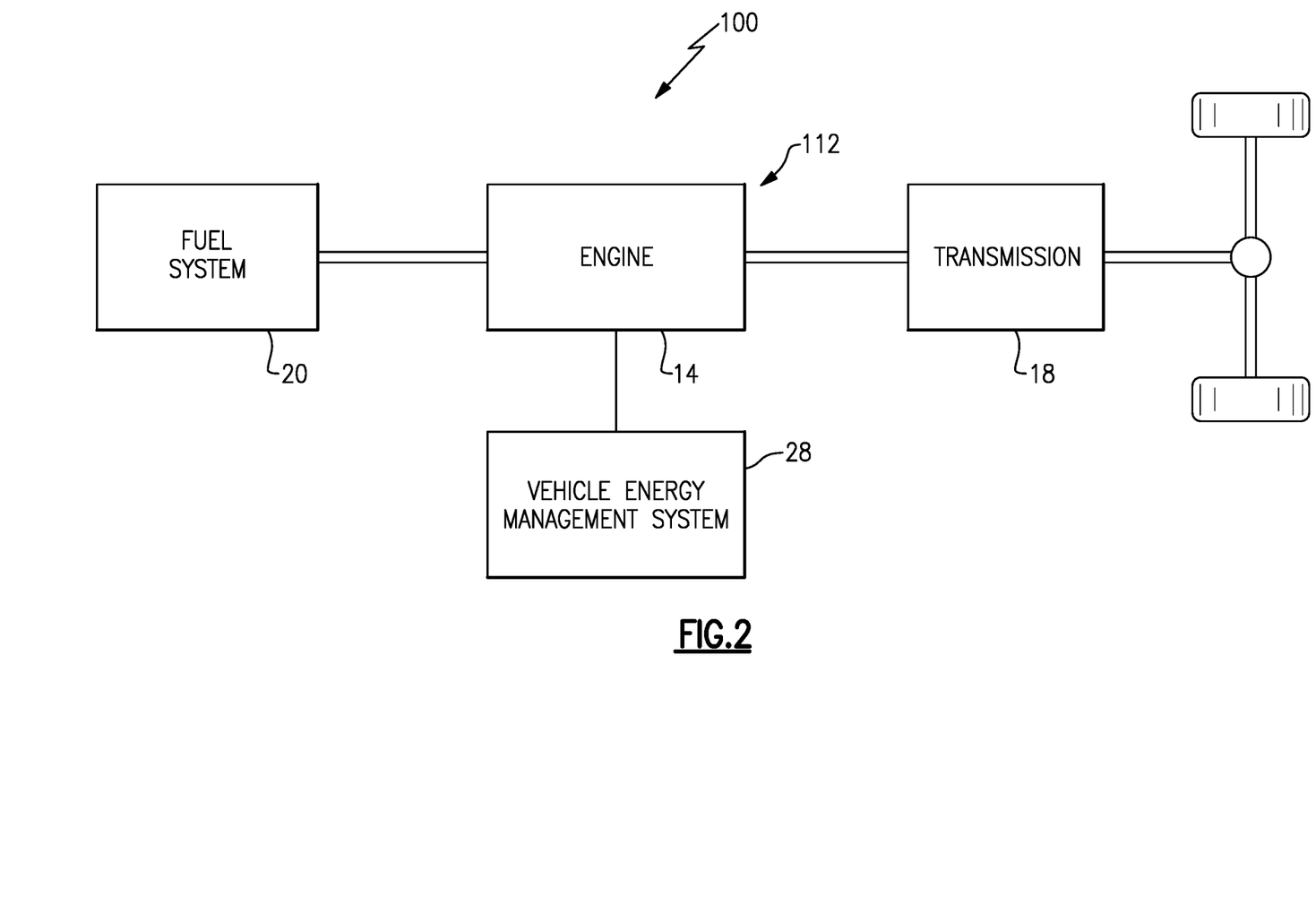
FIG. 2 schematically illustrates a powertrain of another vehicle.

FIG. 2 illustrates a powertrain 112 of another vehicle 100. In a non-limiting embodiment, the vehicle 100 is a conventional vehicle that includes an engine 14, a transmission 18, and a fuel system 20. In this non-limiting embodiment, the engine 14 acts as the sole propulsion device of the vehicle 100.

The vehicle 100 may additionally include the vehicle energy management system 28. Thus, the vehicle energy management system 28 may be used to control the energy usage of either electrified vehicles (as shown in FIG. 1) or conventional vehicles (as shown in FIG. 2).

Figure 3:
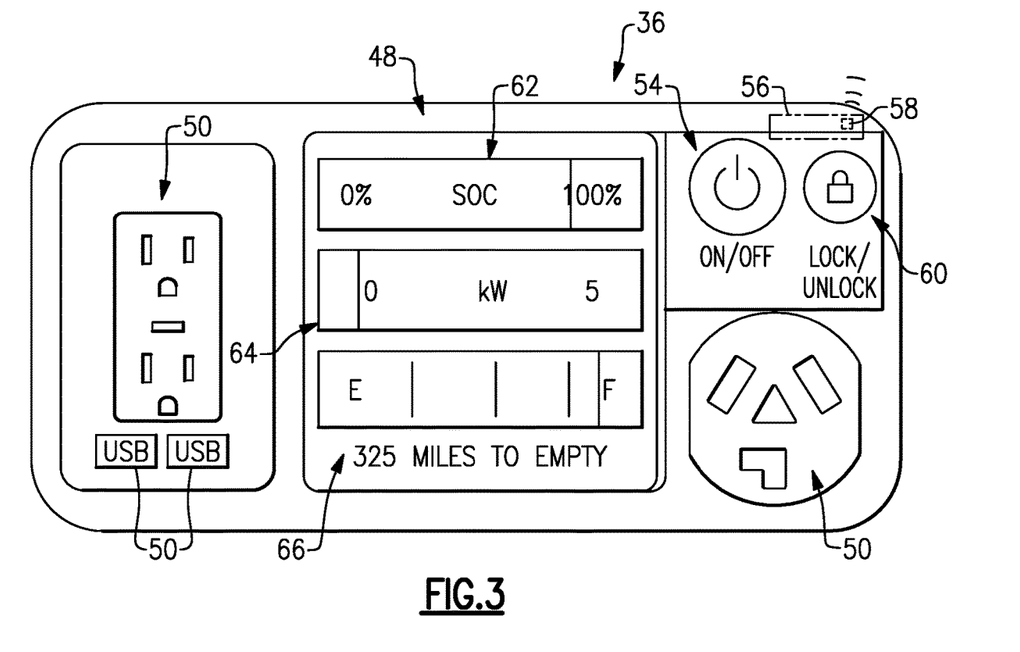
FIG. 3 illustrates a human machine interface for controlling a Power Generation mode of a vehicle.

FIG. 3, with continued reference to FIGS. 1 and 2, illustrates additional features of the HMI 36, which may also be referred to as the second HMI or the power generation HMI. The HMI 36 can be employed for use on the vehicle 10 of FIG. 1, the vehicle 100 of FIG. 2, or any other vehicle equipped to generate power for uses other than propelling the vehicle (i.e., capable of operating in GEN mode). In a non-limiting embodiment, the HMI 36 is accessible by a user at a location remote from the passenger cabin 38 of a vehicle to control the vehicle in GEN mode.

The HMI 36 includes a power button 54. The power button 54 may be pushed or otherwise actuated by a user to start the vehicle and initialize GEN mode. The power button 54 may illuminate after it has been actuated to signify operation in GEN mode. In a non-limiting embodiment, actuating the power button 54 sends a signal to the control unit 32 over the CAN 52 (see FIG. 1). The control unit 32 commands the vehicle to start and initializes GEN mode in response to receiving the signal.

The HMI 36 may include an authentication system 56 for authenticating whether or not a particular user has permission to operate and control the vehicle in GEN mode. For example, the authentication system 56 may include an antenna 58 that emits detection signals in the area surrounding the vehicle. If an authorized key or fob is in the vicinity of the signal, the key/fob will respond to the detections signals by emitting authentication signals back to the authentication system 56. Based on these signals, the authentication system 56 communicates with the control unit 32 over the CAN 52 to determine whether the key/fob is a valid key/fob and thus whether the user is an authorized user. If yes, then the control unit 32 commands the vehicle to enter GEN mode. If no, GEN mode is not activated.

The power button 54 may also indicate fault conditions to the user. For example, the power button 54 may be illuminated or blink if GEN mode is unavailable for any reason. GEN mode may be unavailable for a variety of reasons, including but not limited to, low fuel or battery pack levels, excessive inverter/converter temperatures, excessive bus loads, circuit breaker tripped, etc. In a non-limiting embodiment, the power button 54 is illuminated a different color if a fault exists than if no fault exists. For example, the power button 54 may be illuminated 'green' if GEN mode is available and may be illuminated 'red' if GEN mode is unavailable because of a fault condition.

The HMI 36 further includes a lock button 60. The lock button 60 may be pushed to lock or unlock the HMI 36. No changes can be made to GEN mode if the lock button 60 is in the locked position. The user may also walk away from the vehicle without receiving alerts (e.g., vehicle running, no key/fob present) from the vehicle if the lock button 60 is in the locked position. Alternatively, if the lock button 60 is in the unlocked position, GEN mode can be modified or turned off without the need to identify an authorized key or fob in the vicinity of the vehicle.

The HMI 36 also includes an electronic display 48. The electronic display 48 includes various gauges for displaying information pertinent to GEN mode to the user. In a non-limiting embodiment, the electronic display 48 includes a state of charge (SOC) gauge 62, a power generation gauge 64, and a fuel gauge 66. The SOC gauge 62 displays the current SOC of the battery pack 22 to the user if the vehicle is equipped with the battery pack 22. In a non-limiting embodiment, the current SOC is displayed on the SOC gauge 62 as a percentage between 0% and 100%. In another non-limiting embodiment, the SOC gauge 62 may be illuminated or change colors if the current SOC level is below a threshold SOC level.

The power generation gauge 64 displays the current amount of power being generated by the vehicle while operating in GEN mode. In a non-limiting embodiment, the current amount of power being generated is displayed on the power generation gauge 64 as a unit of kW or any other suitable power unit. In another non-limiting embodiment, the power generation gauge 64 may be illuminated or change colors if the current amount of power being generated exceeds a threshold power generation level.

The fuel gauge 66 displays a current fuel level of the vehicle. The current fuel level may be displayed as a value between full and empty, as a distance to empty calculation, or both. In a non-limiting embodiment, the fuel gauge 66 may be illuminated or change colors if the current fuel level is below a threshold fuel level.

The HMI 36 additionally includes a plurality of power outlets 50. The power outlets 50 are ports for connecting and powering equipment that is completely separate from the vehicle. The specific number and type of power outlets 50 are not intended to limit this disclosure. The power outlets 50 may embody different configurations. For example, in a non-limiting embodiment, at least some of the power outlets 50 supply 120/240 volt AC power at 50/60 Hz to non-vehicle equipment 30 plugged into the power outlets 50. Other of the power outlets 50 may be configured as universal serial bus (USB) ports or other similar ports for plugging in personal devices such as phones, tablets, computers, etc.

In another non-limiting embodiment, the HMI 36 includes waterproof/resistant materials to help prevent moisture intrusion. The HMI 36 could be at least partially made of a durable plastic that is UV resistant. The brightness of the electronic display 48 can be controlled by the first HMI 34 or in any other known manner.

The HMI 36 can be mounted at various locations of a vehicle. As stated above, the location of the HMI 36 is remote from the passenger cabin 38 of the vehicle, such as within a trunk, cargo area, cargo bed, etc. For example, in a first non-limiting embodiment, shown in FIG. 4, the HMI 36 is positioned within a truck bed 70 of a vehicle 200. In a second non-limiting embodiment, shown in FIG. 5, the HMI 36 is positioned within a trunk 72 of a vehicle 300. The HMI 36 could be mounted to any exposed surface of the vehicle that is both remote from the passenger cabin 38 and generally accessible to users.

The exemplary power generation human machine interfaces of this disclosure provide users with the ability to control a vehicle in GEN mode without the need to walk back and forth to the passenger cabin of the vehicle. The power generation interfaces are easily accessible and simply to operate, thereby reducing GEN mode setup times.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    accessing a human machine interface (HMI) of a vehicle, wherein the HMI is located remotely from a passenger cabin of the vehicle and is mounted directly within a wall of a truck bed or a trunk of the vehicle;
    actuating a power button of the HMI to initialize a Power Generation mode of the vehicle;
    authenticating whether a valid key or fob is in a vicinity of the HMI prior to initializing the Power Generation mode;
    wherein power is generated with an engine or an electric machine of the vehicle in response to initializing the Power Generation mode; and
    wherein the power generated by the engine or the electric machine is supplied to a power outlet of the HMI during the Power Generation mode.

2. The method as recited in claim 1, comprising:
    powering non-vehicle equipment during the Power Generation Mode.

3. The method as recited in claim 1, comprising:
    actuating a lock button to lock or unlock the HMI.

4. The method as recited in claim 1, comprising:
    plugging a non-vehicle equipment into the power outlet of the HMI; and
    powering the non-vehicle equipment using power generated by the vehicle during the Power Generation Mode.

5. The method as recited in claim 4, wherein the non-vehicle equipment includes a saw, a drill, or a hand-held power tool.

6. A method, comprising:
    receiving a notification that a power button of a human machine interface (HMI) of a vehicle has been actuated to initialize a Power Generation mode of the vehicle;
    wherein the HMI is located remotely from a passenger cabin of the vehicle and is mounted directly within a wall of a truck bed or a trunk of the vehicle;
    authenticating whether a valid key or fob is in a vicinity of the HMI prior to initializing the Power Generation mode;
    wherein power is generated with an engine or an electric machine of the vehicle in response to authenticating the Power Generation mode; and
    wherein the power generated by the engine or the electric machine is supplied to a power outlet of the HMI during the Power Generation mode.

7. The method as recited in claim 6, wherein the HMI includes an electronic display and at least one power outlet adapted to selectively supply power to non-vehicle equipment.

8. The method as recited in claim 7, wherein the electronic display includes a state of charge (SOC) gauge that displays a current SOC of a battery pack of the vehicle.

9. The method as recited in claim 7, wherein the at least one power outlet includes a universal serial bus (USB) port.

10. The method as recited in claim 7, wherein the electronic display includes a power generation gauge that displays a current amount of power being generated by the vehicle during the Power Generation mode.

11. The method as recited in claim 7, wherein the electronic display includes a fuel gauge that displays a current fuel level of the vehicle.

12. The method as recited in claim 6, wherein the HMI includes a plurality of power outlets, and at least a portion of the plurality of power outlets have different configurations.

* * * * *